Figure 1:
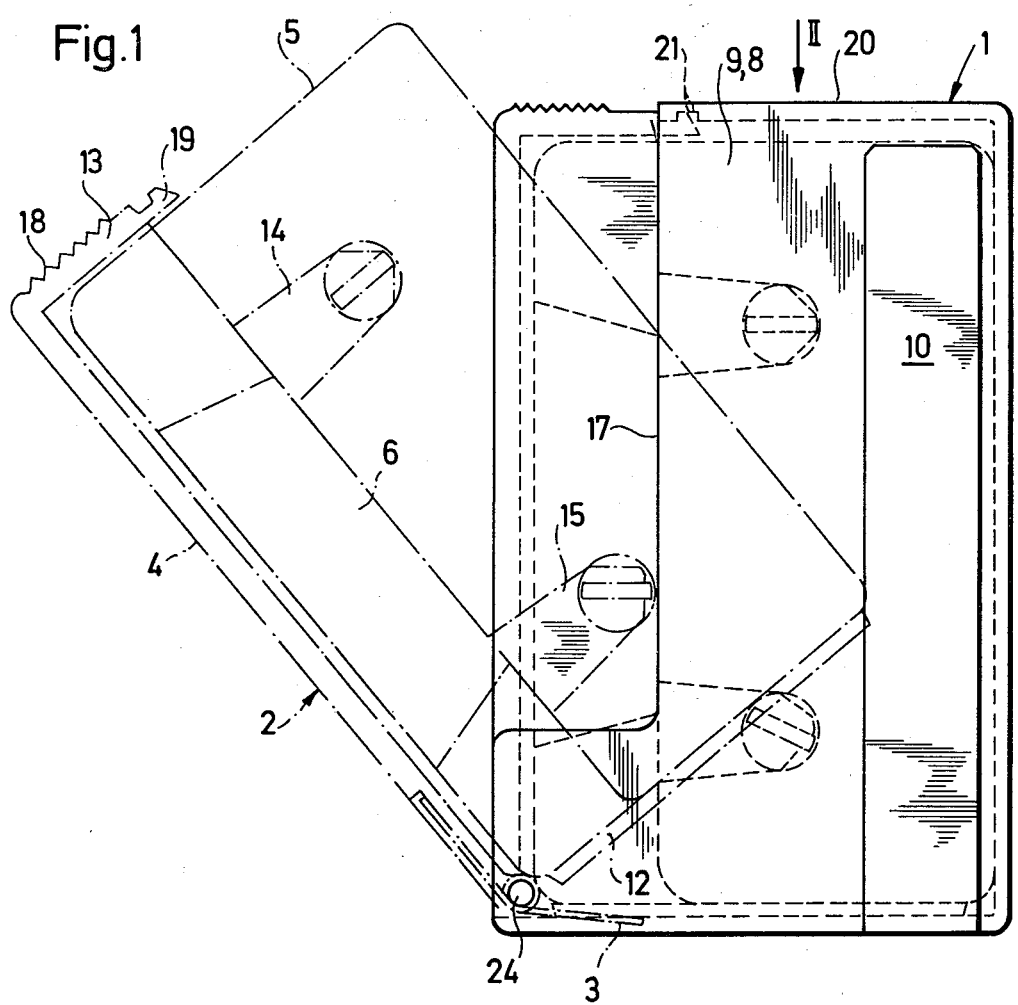

United States Patent [19]

Ackeret

[11] 4,113,091

[45] Sep. 12, 1978

[54] HOLDERS FOR TAPE CASSETTES

[75] Inventor: Peter Ackeret, Kusnacht, Switzerland

[73] Assignee: IDN Inventions and Development of Novelties AG, Lenzerheide, Switzerland

[21] Appl. No.: 583,756

[22] Filed: Jun. 4, 1975

[30] Foreign Application Priority Data

Jun. 5, 1974 [DE] Fed. Rep. of Germany ....... 2427103

[51] Int. Cl.² .............................................. B65D 43/16
[52] U.S. Cl. ..................................... 206/387; 220/335
[58] Field of Search ........................ 206/387; 220/335; 312/13

[56] References Cited

U.S. PATENT DOCUMENTS

| | | | |
|---|---|---|---|
| 3,163,225 | 1/1965 | Reitzel | 220/335 |
| 3,685,684 | 8/1972 | Schindler et al. | 206/387 |
| 3,763,994 | 10/1973 | Somers | 206/387 |
| 3,836,222 | 9/1974 | Kuntze | 312/319 |
| 3,904,259 | 9/1975 | Hoffmann et al. | 206/387 |

Primary Examiner—William Price
Assistant Examiner—Joseph M. Moy
Attorney, Agent, or Firm—H. Dale Palmatier

[57] ABSTRACT

A holder for a tape cassette including a flat, thin and elongate housing to contain a tape cassette, a locking facility in the housing for retaining the tape cassette in the housing, an ejector resiliently urging the tape cassette out of the housing in a pivotal or swinging motion on an axis parallel to the axes of the tape coils, the ejector using leaf or coil springs which bear against a subframe or cover for the housing or which bear directly against the cassette.

11 Claims, 6 Drawing Figures

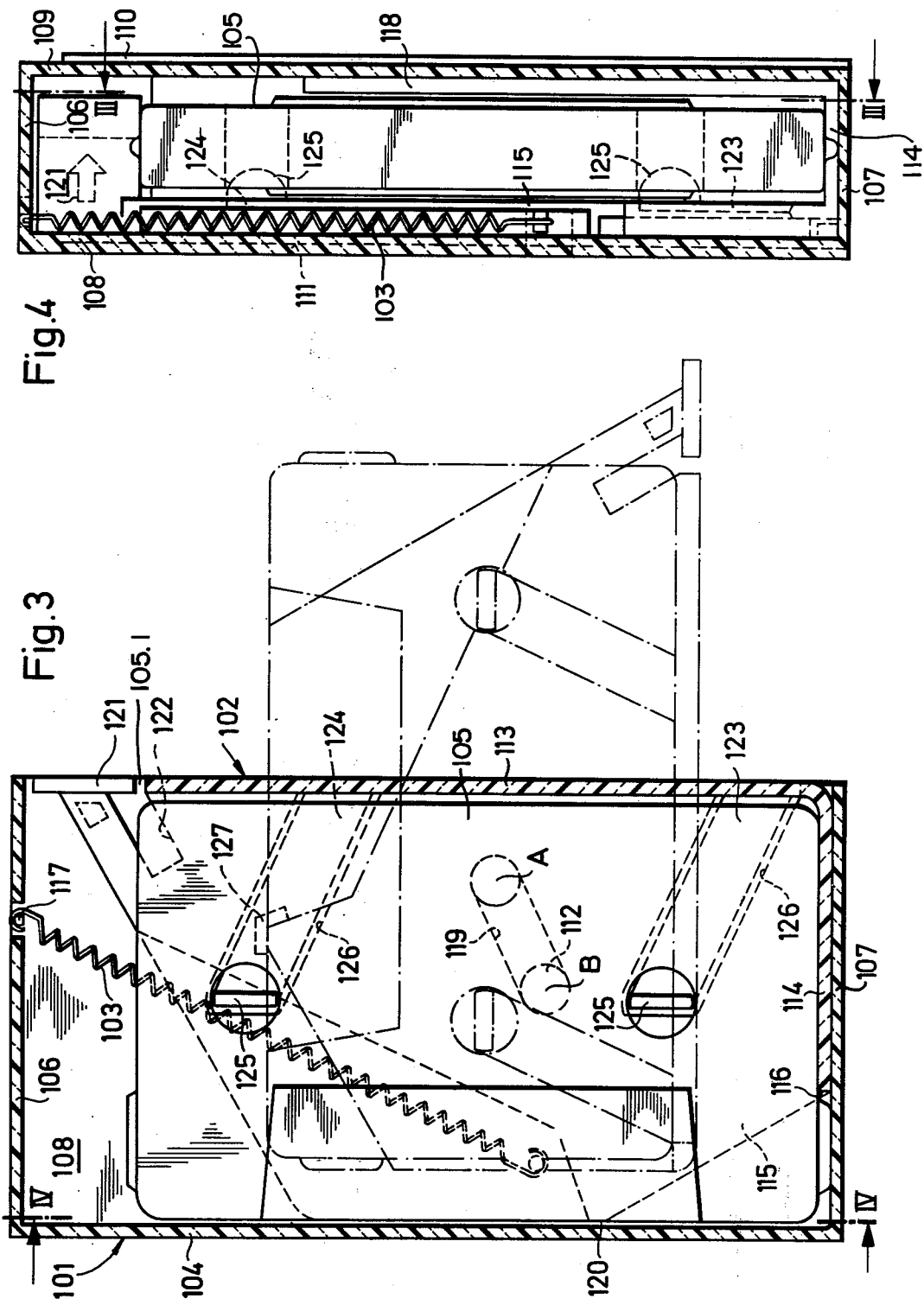

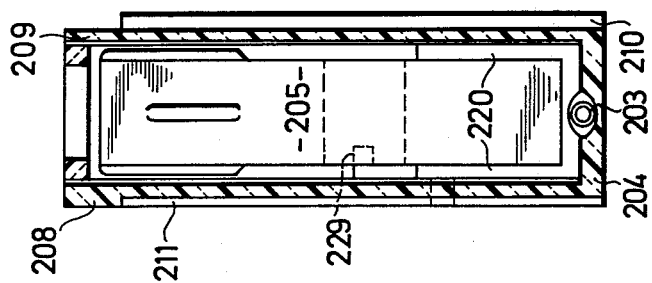
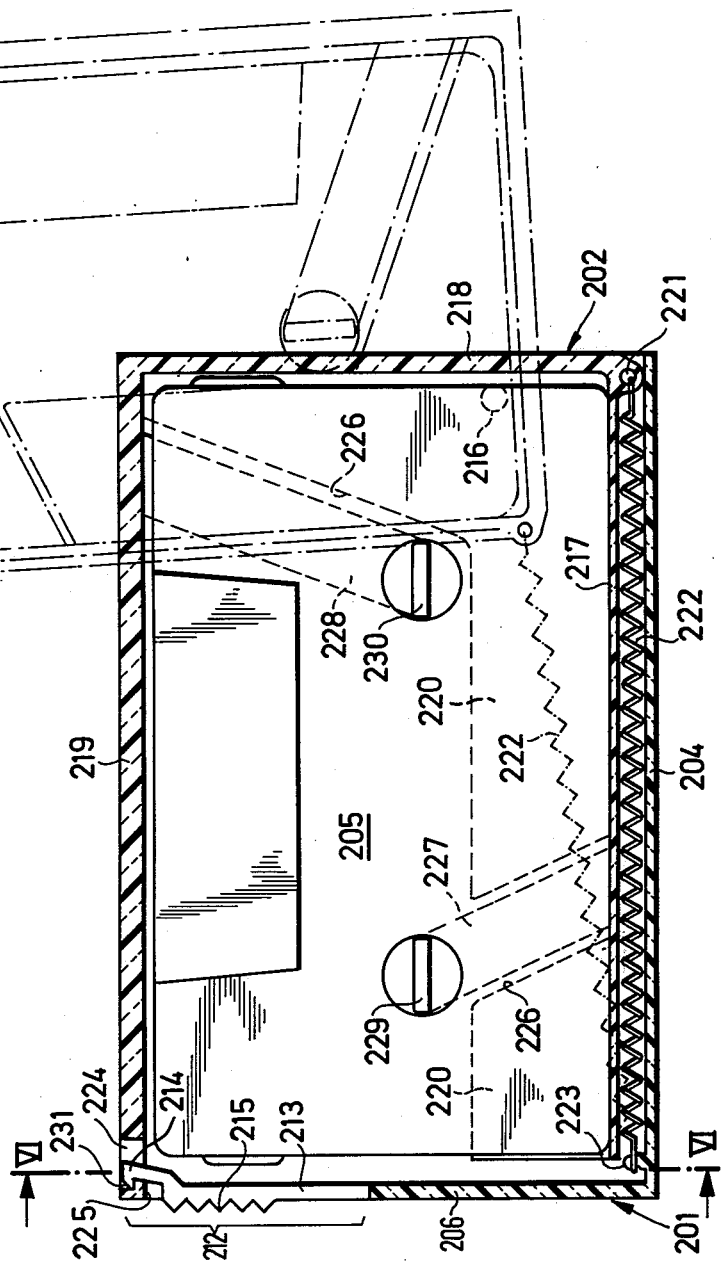

HOLDERS FOR TAPE CASSETTES

The invention relates to holders for tape cassettes, for example magnetic tape cassettes, and the like. The invention relates especially to a holder with a housing enclosing the cassette on at least five of its six sides, and into which the cassette can be introduced so, stressing an ejector spring, and can be locked in the inserted position, and also, after the locking means is released, can be brought into a convenient removal position by means of the ejector spring.

Holders have been proposed which are constructed in the manner of a drawer, i.e. there is a slider in the housing, which accommodates the cassette.

Sliders require guides for the sliding movement and, if the permissible manufacturing tolerances are not accurately maintained, may stick or become loose. Furthermore, with the holder in certain positions they are not absolutely ideal for the removal of the cassette, when perhaps the holder or several holders connected to form a stack are so arranged that the cassettes are standing on a side edge parallel to the direction of movement of the slider.

The object of the invention is to create a holder which will allow wide manufacturing tolerances and from which the cassette is easily removed even when the holder or a holder stack is arranged in an unfavourable manner.

According to the invention the resilient ejector means is constructed and arranged to pivot the cassette about an axis parallel to the tape coil axes, and stops are provided to limit the pivoting movement and secure the cassette in the removal position.

Due to the pivoting, the cassette can be brought into a position in which it is easily grasped with one hand, in such a way that it can be pushed directly into a playing apparatus without a change of grip. The stops prevent the cassette from being catapulted out or — if the holder is unfavourably arranged — from falling out, if holder and playing apparatus are used in a place which is subject to vibration, as for instance in a vehicle.

Figure 2:
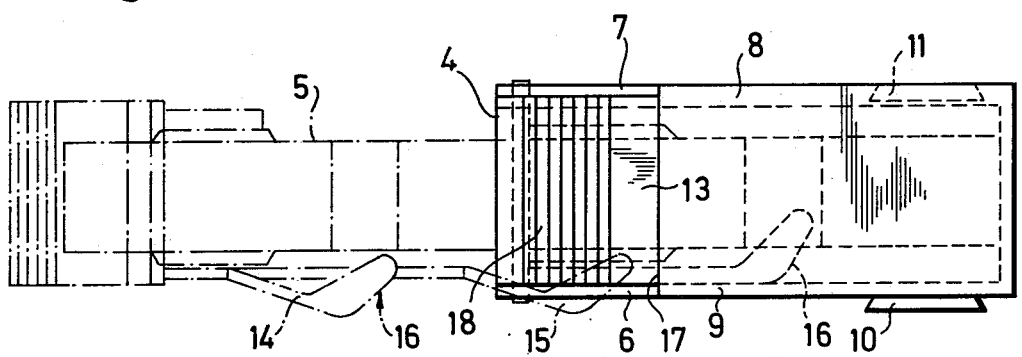

By way of example only, embodiments of the invention will now be described in more detail with reference to the accompanying drawings of which:

FIG. 1 is a somewhat diagrammatic side view of a first embodiment of the invention, FIG. 2 shows a plan view of the holder shown in FIG. 1 in the direction of the arrow II, FIG. 3 is a longitudinal section along the line III—III in FIG. 4 of a second embodiment, FIG. 4 is a section along the line IV—IV in FIG. 3, FIG. 5 is a longitudinal section of a third embodiment, FIG. 6 is a section along the line VI—VI in FIG. 5.

The holder shown in FIGS. 1 and 2 has a substantially box-shaped housing 1, the two side walls 8, 9 of which are provided with means for stacking several similar holders. For this purpose a rail 10 with dovetail-shaped cross-section is moulded on side wall 9, whilst the opposite side wall 8 is provided with a groove 11 corresponding to the rail 10. Rail 10 and groove 11 in each case allow holders to be stacked by fitting the rail of one holder into the groove of an adjacent holder.

In the housing 1, pivotally mounted on the housing by a stud 24, is a cassette-engaging carrier 2 which is biassed outwards by means of a spring 3. The carrier, like the housing otherwise, is a one-piece injection moulded part of a plastics material. It has a base wall 4, two side strips 6, 7, a supporting strip 12, and a hook strip 13. Moulded on the side strip 6 there are two tongues 14, 15 which in their rest positions project outwards from the side strip 6 and are so arranged that with the cams 16 formed on them they are directed into the tape coil apertures of an inserted cassette 5. When the carrier 2 is pivoted into the housing, an oblique surface of the cams 16 meets the edge 17 of wall 9, so that the cams are pushed inwards and secure the tape coils of the cassette.

It can be seen from FIG. 1 that the wall 9 has a portion of reduced width as compared with the remainder of the wall and this reduced width portion is bounded along one edge by edge 17.

The hook strip 13 can be flexibly deflected inwards in relation to the remainder of the carrier because of lateral slots on each side of the strip (not shown), and is provided with a serrated surface 18 on the outside. In addition, a hook extension 19 with its locking surface projects outwards on the free end of the hook strip. A locking recess 21 corresponding to the hook extension 19 is provided on the inside of an end wall 20 of the housing 1.

To remove a cassette 5, pressure is exerted on the surface 18 with the finger, and the hook extension is thus released from the recess 21. Under the influence of the spring 3, the carrier 2 then pivots out of the housing 1, whilst stops (not shown) limit the pivoting movement an arc of about 90°. On emerging from the housing 1, the cams 15 also return to their rest positions (indicated by dash-dotted lines in FIG. 2) and free the tape coils of the cassette 5. The cassette can therefore be removed from the carrier without difficulty. Hook strip 13, base strip 4, and side strips 6, 7 thereby serve as stops which prevent the cassette 5 from tipping or falling out.

To store the cassette, it is replaced in the carrier and the latter is pivoted back into the locking position, which is shown by solid lines in FIG. 2. The support strip 12 thereby serves as a stop surface which pushes or lifts the cassette out again when opened.

The embodiment shown in FIGS. 3 and 4 is also in two parts. Insofar as the individual elements correspond in function to those of the embodiment shown in FIGS. 1 and 2 they are provided with the same reference numbers.

The holder has three elements which are movable with respect to one another: the housing 101, the carrier 102, and the traction spring 103.

The housing 101 is in the shape of a box with an elongate, slot-like entrance on one long narrow side, and opposite a base wall 104, end walls 106, 107 and side walls 108, 109. The side walls are provided with known means for the connection of several similar holders to form a stack; in the embodiment shown two or more rails 110 are provided which are moulded onto the side wall 109, run parallel to one another and to the base, and have a dovetail profile, whilst the other side wall 108 has grooves 111 corresponding to the rails 110, into which the rails 110 of a further holder can be pushed.

An elongated recess 119 is formed on the inside of the side wall 108.

The cassette-manipulating carrier consists of a front strip 113, an end strip 114, and a base plate 115 which are butted together at 90° in each case to form a one-piece injection-moulded part of a plastics material. The housing is also a one-piece plastics part. Between the free end edge 116 of the end strip 114 and an anchorage point 117 on the side wall 106 of the housing 101 there is tensioned a spring 103 (see FIG. 4) which lies between the side wall 108 of the housing and the base-plate 115 of the carrier. There is room for the cassette 105 on the side of the base-plate 115 furthest from the spring 103; on the edge of the front strip 113 opposite the base-plate 115 a retaining strip 118 to embrace the cassette may also be formed if necessary, which then lies in a plane parallel to the base-plate 115 as indicated in FIG. 4. Normally the spring 103 is tensioned when the carrier 102 is fully within the housing as shown in full lines in FIG. 3, and the spring is substantially relaxed when the carrier 102 is swung out of the housing. See dot-dash lines of FIG. 3.

The base-plate 115 has moulded on it a projection 112 which fits into the elongated recess 119. In the closed state of the holder the tip 120 of the base-plate rests against the base 104 of the housing 101 and the projection 112 is in the position "B" in relation to the elongated recess 119. If the carrier is then freed from this position, it pivots under the influence of the spring 103 into the position shown by dash-dotted lines in FIG. 3, and also executes a movement towards the outside in such a way that the projection 112 then assumes the position "A" in the elongated recess 119. It is of course possible for the projection to be provided on the side wall 108 and the elongated recess on the carrier; the positions "A" and "B" then interchange.

In addition, a locking lever 121 extending cassette-retaining wall portion is moulded on the base-plate 115. Because of a slot 122 in the lever 121, the latter can be flexibly deflected in the direction of the arrow in FIG. 4 and thus free a mechanical locking means which is not shown in detail and which engages again when the container is closed.

Finally, flexible arms are tongues 123, 124 are formed on the base-plate by slots 126 in the latter. Each tongue carries a cam 125 aligned with the tape coil apertures of the cassette 105. The cams 125, which normally obstruct movement of the cassette, are semi-circular in shape as shown in FIG. 4 so that when the cassette moves in relation to the carrier they can yield and can easily be pushed away as the arms 123, 124 are flexed and do not prevent either removal or insertion. The cams thereby provide a yieldable obstruction to the movement of the cassette.

When the container is opened, the point 120 catches on a projection 127 which is moulded on the side wall 108 and limits the opening movement. The cassette is prevented from tipping or falling out by the side walls of the housing 101, the front strip 113 of the carrier, and the securing cams 125 for the tape coils.

The third embodiment of the invention shown in FIGS. 5 and 6 also consists of two main parts, i.e. the housing 201 and the carrier 202, both of which are one-piece injection moulded parts of plastics material.

The housing 201 has two side walls 208, 209, a base 204 and an end wall 206. The side walls 208, 209 are provided with means for stacking several similar containers: the wall 209 carrying two or more rails 210 with dovetail profile, whilst a corresponding number of matching grooves 211 is formed in the wall 208. Stacking is effected by pushing the rail or rails on one holder into the groove or grooves of the other holder.

The end wall 206 is provided with lateral slots along a length 212, to form a tongue 213 which can be flexibly deflected. The tongue carries at its free end a hook extension 214, and a serrated surface 215 in formed on the outside of the tongue 213.

The carrier 202 is pivotally mounted on the housing 201 by means of a stud 216. The carrier consists of three strips 217, 218 and 219 joined together in a U-shape, being connected to one another and stiffened by means of thin cross-plates 220. Outside the corner between the strips 217 and 218 there is an eye 221, to which is attached one end of a pre-tensioned traction spring 222, the other end of which is fixed at 223 in the corner between the base 204 and the end wall 206 of the housing 201. A helical spring is indicated here, a rubber band may also be used instead. FIG. 6 shows that the space for the spring is cut out of the base 204 of the housing and the strip 217 of the carrier 202.

Cut into the free end of the strip 219 is an aperture 224 which is aligned with the hook extension 214 when the holder is closed (FIG. 5), and has a locking step 225.

If it is required to secure the tape coil spools of the cassette 205 during storage it is possible — as shown in FIGS. 5 and 6 — to provide slits 226 in one of the reinforcing cross-plates 220, so producing tongues 227, 228 which can be flexibly deflected and which have tape securing cams 229, 230 moulded on them. The shape of the cams 229, 230 is approximately semi-circular and they can be pushed away when the cassette is removed or inserted, and then drop into the tape coil apertures of the cassette.

The removal position of the parts is shown by dash-dotted lines in FIG. 5. The cassette 205 cannot tip out, since it is supported laterally by the housing and the cross-plates; but it can easily be pulled out and removed in the direction of the projection of the strip 219. For storage, the cassette is then inserted as indicated by dash-dotted lines in FIG. 5, and the carrier is pivoted about the stud 216, tensioning the spring 222, until the hook extension 214 enters the aperture 224, is deflected flexibly (a corresponding oblique surface 231 is moulded on the hook extension 214 for this purpose) and then springs back into the step 225. A slight pressure on the serrated surface 215 suffices to open the holder, so that the hook extension 214 is freed and the carrier springs open under the influence of the spring 222.

A special stop to limit the opening movement is not necessary, since in the opening state the stud 216 just lies on the line of traction of the spring 222. The carrier can indeed execute a certain pendulum movement about this position during opening, but finally comes to rest in the position shown (FIG. 5, dash-dotted lines). This embodiment therefore produces very little strain on the material of housing, carrier and cassette, and furthermore offers the advantage that it is very space-saving; consequently the material consumption for housing and carrier is kept at a minimum.

What we claim is:

1. A holder for tape cassettes and the like comprising a housing for receiving the cassette and having broad and spaced sidewalls to receive a cassette therebetween and having narrow end and base walls between the sidewalls and also having a narrow slot-shaped entrance opposite one of said narrow walls whereby to receive and carry the cassette with the reel axes extending transversely through the broad sidewalls, manipulating means on the housing for engaging the cassette when introduced into the housing, said manipulating means including a cassette-engaging portion swingable relative to said narrow walls and about at least one axis extending transversely through the planes of the sidewalls to swing with the cassette as the cassette swings inwardly and outwardly of the entrance, said manipulating means including a spring urging said cassette-engaging portion generally toward the entrance for thrusting the cassette outwardly through the entrance, and said manipulating means also including locking means connected with the housing and opposing the thrust of the spring to cooperate with the cassette-engaging portion in retaining the cassette in the housing, and the manipulating means including a pair of elongated flexible arms and a cam mounted on each of the arms and facing inwardly of the housing adjacent the entrance to confront, engage and obstruct the cassette as the cassette emerges partly through the entrance under the initial thrust provided by the spring and also retaining the cassette against falling out by tipping about axes lying parallel to the sidewalls of the housing.

2. A holder according to claim 1 and the cassette-engaging portion comprising an elongate carrier with one end hinged to the housing for swinging movement between a first position substantially within the housing and along the entrance and a second position projecting partly out of and partly into the housing and oriented transversely of and through the entrance, the carrier having one closed narrow side traversing said entrance in said first position and also having a second closed narrow side adjacent said one side and also adjacent the hinge, and the carrier having a narrow open side opposite one of said closed sides to accept the cassette therethrough, and the flexible arm being mounted on the carrier and the cam projecting slightly across the elongate carrier to engage and yieldably obstruct sliding removal of the cassette from the carrier, said cam being oriented with an oblique camming face confronting said open side.

3. A holder according to claim 1 in which the cam on the cassette-engaging portion projecting transversely of the sidewalls for holding the tape coils of the cassette.

4. A holder according to claim 3 in which the cassette-engaging portion includes housing parts which can be pivoted together with the cassette.

5. A holder according to claim 1 in which the spring comprises a helical spring which is anchored to the housing, and to the cassette-engaging portion which can be pivoted out with the cassette.

6. A holder according to claim 1 in which the cassette-engaging portion is mounted on the housing for linear displacement movement in addition to the pivoting movement.

7. A holder for a tape cassette according to claim 1 and the locking means acting in opposition to said spring and cooperating with the thrust produced by the spring in enhancing the retention of the cassette in the housing.

8. The holder for tape cassettes according to claim 1 and said cassette-engaging portion and cam cooperatively obstructing movement of the cassette except in a direction parallel to the side walls and through the entrance.

9. The holder for tape cassettes set forth in claim 1 and the housing having two end walls adjacent opposite ends of the entrance, and said cassette-engaging portion comprising an elongate carrier on the housing and removably mounting a cassette thereon, guide means on the housing and carrier and permitting limited coordinated swinging and sliding of the elongate carrier between a first position substantially within the housing and along the entrance and a second position projecting partly out of and partly into the housing and oriented transversely of and through the entrance, and the flexible arm being mounted on the carrier and the cam projecting slightly across the elongate carrier to engage and yieldably obstruct sliding removal of the cassette from the carrier.

10. The holder for tape cassettes set forth in claim 9 and the elongate carrier having one end over which the cassette may slide for removal said one end being confined with the housing in the first position of the carrier, said guide means on the housing and carrier including a slot on one and a projection on the other and disposed in the slot and guided thereby, the slot extending in an oblique direction toward the entrance and toward said one end of the carrier when the carrier is disposed in said first position, whereby to permit movement of the carrier in said oblique direction and coordinated swinging to said second position.

11. A holder according to claim 1, in which the housing is provided with engaging surfaces to enable the housing to be stacked with another housing of similar engaging surfaces.

* * * * *